UNITED STATES PATENT OFFICE.

CHRISTOPHER J. HEALY, OF NEW YORK, N. Y., ASSIGNOR OF THREE-EIGHTHS TO CHARLES BRUECKNER, OF BROOKLYN, NEW YORK, AND ONE-FOURTH TO JAMES HAMILTON, OF EAST ORANGE, NEW JERSEY.

THIN LEAFLIKE SHEET AND METHOD OF MAKING THE SAME.

1,051,953.   Specification of Letters Patent.   Patented Feb. 4, 1913.

No Drawing. Original application filed December 2, 1909, Serial No. 531,050. Divided and this application filed April 15, 1911. Serial No. 621,331.

*To all whom it may concern:*

Be it known that I, CHRISTOPHER JOSEPH HEALY, a citizen of the United States, residing at the borough of Brooklyn, city of New York, in the county of Kings and State of New York, have invented certain new and useful Improvements in Thin Leaflike Sheets and Methods of Making the Same, of which the following is a specification.

This invention relates to improvements in leaflike material for use in the arts; and an object of this invention is to provide such a leaflike material and a method of making the same which will be simple, comparatively cheap and most efficient.

I have discovered that leaflike material may be made from resinous substances, such as resins, gums and copals; and the method by which I treat the resinous substance to produce the leaflike material is as follows: If commercial gum or resin is used, it will be found to contain a certain amount of soft, more readily saponifiable substance which should be removed. To do this, the resinous material is reduced to a liquid state by heating it and the resulting liquid is then mixed with a suitable saponifier, such as caustic soda. The soap produced by the resulting reaction is washed away and the resinous substance is thus thoroughly cleansed of the soft, more readily saponifiable matter just mentioned. The resinous matter which is left after this saponification treatment is now allowed to dry and is next dissolved in any suitable solvent, such as alcohol, ether, acetone, amyl acetate, benzole, naphtha, gasolene, benzin, turpentine or a mixture of any two or more of these solvents. To the solution so formed, an oil is added, care being taken that the oil used is compatible with the particular solvent or solvents to which it is added. A suitable non-adherent surface is next prepared to receive the solution so that, when the latter is poured upon the surface, it will spread out in a thin sheet without adhering to the latter. Such a surface is the surface of a two per cent (2%) solution of nitric acid.

When the solution of oil, resinous substance and solvent is poured upon the non-adherent surface, it spreads out in a thin layer, sheet or film which is allowed to dry and is then cut to the size required by the trade.

The leaflike material may be readily given any desired color. For this purpose a suitable coloring matter or pigment is added to the solution of the resinous substance. If the leaflike material is to be colored and opaque, an earthy pigment or coloring substance may be used; while if the leaflike material is to be colored and yet transparent, an aniline coloring substance may be added. If coloring substances are used, the oil used should be such as is compatible with the coloring matter selected. The latter should be such as will mix freely and readily with the oil and solvent to which it is added.

As examples of the oils which may be found suitable for use in the preparation of my new leaflike material, the following may be named: essential oils, mineral oils, paraffin oil, fusel oil, linseed oil, castor oil, kidney oil, olive oil and Chinese wood oil; but any oil compatible with a mixture of spirits and coloring matter may be used. Among the resinous substances which may be used the following may be named: copals, sandarach, mastic, dammar gum, rosin and pitch.

As a specific illustrative example the following may be given: Let it be supposed that Zanzibar gum is used. This gum is first treated with a suitable alkali, such as caustic potash or caustic soda, whereby the soft, more readily saponifiable part of the commercial gum is removed. Any one skilled in this art may treat the gum with lye so as to avoid the corrosion of the body of the gum; and the residue left after this treatment will, therefore, consist of the body part of the commercial gum which remains after the removal of the soft, more readily saponifiable part thereof. This resinous residue is now dissolved in a suitable solvent, such as alcohol. For one pound of the residue, forty-five (45) pounds of alcohol are taken; and to the solution thus formed are added, three (3) pounds of castor oil, which is an oil compatible with alcohol. The character and the amount of the coloring matter will depend upon the nature of the leaf desired and the tint or shade to be produced. If an opaque leaf is to be produced, earthy coloring matter is used, while if a transparent leaf is to be made, aniline coloring matter is used. The amount of the coloring matter used will depend upon the depth of shade desired.

I regard as an important feature of my invention the saponification treatment of the gum; for, if the gum be not so treated, the leaf will stick to the hot die and will, moreover, be spotted and weak.

It will be understood that the oil serves to make the solution spread out freely upon the surface of the nitric acid solution (or non-adherent surface); and the volatile solvent used rapidly evaporates, leaving a thin leaflike sheet of resinous substance which is dried, cut in sizes and placed between leaves (as of paper) for safety. But the dried-out leaflike sheet of resinous substance does not, however, necessarily contain oil as an ingredient or constituent.

This application is filed as a divisional application under United States Patent No. 990,261, granted April 25, 1911.

I claim:

1. A thin leaflike sheet the body of which consists of resinous matter which remains after the soft, more readily saponifiable part of the commercial resinous substance has been removed.

2. A thin leaflike sheet having a body of resinous matter which remains after the soft, more readily saponifiable part of the commercial resinous substance has been removed and with which a coloring matter has been incorporated.

3. A thin leaflike sheet having a body of resinous matter which remains after the soft, more readily saponifiable part of the commercial resinous substance has been removed and with which an oil has thereafter been mixed.

4. A thin leaflike sheet having a body of resinous matter which remains after the soft, more readily saponifiable part of the commercial resinous substance has been removed and with which an oil and coloring matter have been mixed.

5. The process which consists in depriving a resinous substance of its soft, readily saponifiable part and then forming the resinous residue into a thin leaflike sheet.

6. The process which consists in depriving a resinous substance of its soft, readily saponifiable part and then forming the resinous residue into a thin colored leaflike sheet.

7. The process which consists in depriving a resinous substance of its soft, readily saponifiable part; mixing the resinous residue with an oil; and forming from the mixture a thin leaflike sheet.

8. The process which consists in depriving a resinous substance of its soft, readily saponifiable part; mixing the resinous residue with an oil; and forming from the mixture a thin colored leaflike sheet.

Signed at Brooklyn, New York, this eight (8') day of April, 1911, in the presence of the two undersigned witnesses.

CHRISTOPHER J. HEALY.

Witnesses:
CHARLES BRUECKNER,
GUSTAVE R. WARMERS.